(12) United States Patent
Li et al.

(10) Patent No.: US 8,597,539 B2
(45) Date of Patent: Dec. 3, 2013

(54) CHEMICAL MECHANICAL POLISHING (CMP) POLISHING SOLUTION WITH ENHANCED PERFORMANCE

(75) Inventors: Yuzhuo Li, Heidelberg (DE); Harvey Wayne Pinder, Potsdam, NY (US); Shyam S. Venkataraman, Potsdam, NY (US)

(73) Assignee: BASF SE, Ludwigshafen (DE)

( * ) Notice: Subject to any disclaimer, the term of this patent is extended or adjusted under 35 U.S.C. 154(b) by 33 days.

(21) Appl. No.: 13/122,496

(22) PCT Filed: Sep. 29, 2009

(86) PCT No.: PCT/EP2009/062578
§ 371 (c)(1),
(2), (4) Date: Jun. 17, 2011

(87) PCT Pub. No.: WO2010/037730
PCT Pub. Date: Apr. 8, 2010

(65) Prior Publication Data
US 2011/0269312 A1    Nov. 3, 2011

Related U.S. Application Data

(60) Provisional application No. 61/102,457, filed on Oct. 3, 2008.

(51) Int. Cl.
*C09K 13/06*    (2006.01)
(52) U.S. Cl.
USPC ................ 252/79.4; 252/79.1; 216/88
(58) Field of Classification Search
None
See application file for complete search history.

(56) References Cited

U.S. PATENT DOCUMENTS

| | | |
|---|---|---|
| 2002/0095872 A1 | 7/2002 | Tsuchiya et al. |
| 2005/0215060 A1 | 9/2005 | Oh et al. |
| 2007/0069176 A1 | 3/2007 | Kato |
| 2010/0178768 A1 | 7/2010 | Li |

FOREIGN PATENT DOCUMENTS

EP    1 580 248    9/2005

OTHER PUBLICATIONS

Chen, C-Yu. et al., "Operational Aspects of Chemical Mechanical Polishing Polish Pad Profile Optimization", Journal of the Electrochemical Society, vol. 147, No. 10, pp. 3922-3930, (2000).
Ul-Hasan, I. et al., "Spectroscopic and Topographic Investigations of Nanoparticle Abrasive Retention in Polyurethane CMP Pads For Cu CMP", Mater. Res. Soc. Symp. Proc., vol. 991, pp. 65-70, (2007).
Tregub, A. et al., "Pad Degradation During CMP Pr.6ocess: Effect of Soak in Slurry and Water on Thermal and Mechanical Properties of the CMP Pads", Mater. Res. Soc. Symp. Proc., vol. 767, pp. 101-110, (2003).
Moy, A. L. et al., "Polyurethane Pad Degradation and Wear Due to Tungsten and Oxide CMP", Mat. Res. Soc. Symp. Proc., vol. 671, Pages Total pp. 9, (2001).
International Search Report Issued Jan. 8, 2010 in PCT/EP09/062578 filed Sep. 29, 2009.
U.S. Appl. No. 13/266,520, filed Oct. 27, 2011, Li, et al.
U.S. Appl. No. 13/318,964, filed Nov. 4, 2011, Raman, et al.
U.S. Appl. No. 13/318,911, filed Nov. 4, 2011, Raman, et al.
U.S. Appl. No. 13/376,270, filed Dec. 5, 2011, Zhang, et al.
U.S. Appl. No. 13/510,514, filed May 17, 2012, Raman, et al.
U.S. Appl. No. 13/510,830, filed May 18, 2012, Raman, et al.
U.S. Appl. No. 13/503,753, filed Apr. 24, 2012, Lauter, et al.
U.S. Appl. No. 13/580,039, filed Aug. 20, 2012, Raman, et al.
U.S. Appl. No. 13/821,757, filed Mar. 8, 2013, Li, et al.
U.S. Appl. No. 13/821,759, filed Apr. 25, 2013, Noller, et al.
U.S. Appl. No. 13/821,746, filed Mar. 8, 2013, Li, et al.
U.S. Appl. No. 13/821,769, filed Mar. 8, 2013, Li, et al.

*Primary Examiner* — Binh X Tran
*Assistant Examiner* — David Cathey, Jr.
(74) *Attorney, Agent, or Firm* — Oblon, Spivak, McClelland, Maier & Neustadt, L.L.P.

(57) ABSTRACT

This invention relates to a chemical composition for chemical mechanical polishing (CMP) of substrates that are widely used in the semiconductor industry. The inventive chemical composition contains additives that are capable of improving consistency of the polishing performance and extending the lifetime of a polishing pad.

20 Claims, No Drawings

CHEMICAL MECHANICAL POLISHING (CMP) POLISHING SOLUTION WITH ENHANCED PERFORMANCE

This application is a 371 of PCT/EP2009/062578 filed Sep. 29, 2009, and claims benefit of U.S. provisional application Ser. No. 61/102,457, filed Oct. 3, 2008.

INCORPORATION BY REFERENCE

Any foregoing applications, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. Citation or identification of any document in this application is not an admission that such document is available as prior art to the present invention.

FIELD OF THE INVENTION

This invention relates to a chemical composition for chemical mechanical polishing of substrates that are widely used in the semiconductor industry. The inventive chemical composition contains additives that are capable of improving consistency of the polishing performance and extending the lifetime of a polishing pad.

BACKGROUND OF THE INVENTION

Chemical mechanical polishing (CMP—also referred to as chemical mechanical planarization or chemical mechanical etching) is a well-known technology used in fabricating advanced photonic, microelectromechanical (MEM), and microelectronic devices, such as semiconductor wafers. See e.g. Chemical-Mechanical Processing (Springer Series in Materials Science), Michael R. Oliver, Springer Publ., (Mar. 24, 2006); Microchip Fabrication, Peter Van Zant, McGraw-Hill (2004); Chemical Mechanical Polishing in Silicon Processing, Volume 63 (Semiconductors and Semimetals), Eds. Shin Hwa Li and Robert O. Miller, Academic Press (1999); Chemical Mechanical Planarization of Microelectronic Materials, Steigerwald et al., John Wiley & Sons (1997).

In the field of semiconductor fabrication, chemical mechanical polishing is used to planarize metal and/or oxide substrates. CMP uses both chemical and mechanical action to obtain the desired planarity of the surface to be polished. Chemical action is provided by a mixture of chemicals which is termed as "slurry" usually consisting of abrasives and various additive compounds which include family of chelating agents, passivating agents, oxidizing agents, accelerators etc., Mechanical action is provided by pressing to-be-polished substrate onto the surface of a polishing pad adhered to a moving platen. Movement of platen is typically linear, rotational or orbital.

In a typical chemical mechanical polishing process, a rotating wafer holder brings the wafer to be in contact with a polishing pad or CMP pad. One of the key consumables in conventional CMP processes is the CMP pad or polishing pad. The CMP pad is mounted on a rotating platen. A polishing medium, such as an abrasive slurry, is applied between the wafer and the pad.

Suitable polishing pads made of polymer which include, but not limited to polyvinyl chloride, polyvinyl fluoride, nylon, fluorocarbon, polycarbonate, polyester, polyacrylate, polyether, polyethylene, polyamide, polyurethane, polystyrene, polypropylene, conformed products thereof, and mixtures thereof.

The useable lifetime of the polishing pad is typically determined by observing detrimental decrease in the removal rate (RR), increase in non-uniformity, and/or an increase in surface defects. The deterioration of the pad performance can be traced to a wide range of physical changes in pad such as significant reduction in pad groove depth, porosity, modulus strength, etc. The sources of these physical changes are usually attributed to mechanical stress such as polishing down force, conditioning, temperature, etc.

In addition, the performance decrease over the course of time of polishing can be attributed to an effect called glazing. The pad glazing is often a result of pad debris covering the asperities and pores of the pad thereby leading to a lower material removal rate. These aspects of the physical change have been well documented and studied. See for example, Chen et al., Operational aspects of chemical mechanical polishing, Journal of The Electrochemical Society, 147 (10) 3922-3930 (2000); Ul-hasan et al., Spectroscopic and topographic investigations of nanoparticle abrasive retention in polyurethane CMP pads for Cu CMP, Mater. Res. Soc. Symp. Proc. Vol. 991 (2007); Tregub et al., Pad degradation during CMP process: Effect of soak in slurry and water on thermal and mechanical properties of the CMP pads, Mater. Res. Soc. Symp. Proc. Vol. 767 (2003); Moy et al., Polyurethane pad degradation and wear due to tungsten and oxide CMP, Mater. Res. Soc. Symp. Proc. Vol. 671 (2001).

Other factors that could significantly alter the physical changes of the pad include chemical reactions such as hydrolysis and oxidation. There has been much less documentation in the art which addresses this aspect of changes in pad lifetime.

Specifically, a CMP slurry can interact with the polishing pad surface and cause chemical reactions within. For example, under extreme acidic and alkaline conditions, —COC— and —COOC— groups in polyurethane elastomers can hydrolyze over time at an accelerated rate. A chemical change in pad materials may lead to a significant alteration of pad surface properties such as surface tension or hydrophibicity, which in turn may lead to enhanced or suppressed removal rates based on its surface property of the pad. A chemical alteration at this level cannot be easily remediated by physical means such as pad conditioning.

As such, a problem remains in the art with respect to maintaining sufficient lifetime for polishing pads and also for maintaining adequate removal rates and selectivity during the lifetime of the polishing pad.

Surprisingly, these problems in the art can be overcome with the addition of environmentally benign agents that provide a buffer mechanism to reduce the impact of the chemical attacks on the polishing pads. More specifically, as disclosed by this invention, a set of hydrophobic amino acids is found to be effective in reducing the effect of chemical attack by strong acids on polishing pads.

SUMMARY OF THE INVENTION

The object of the present invention is to provide a CMP composition which is appropriate for use in a process for chemical mechanical polishing and maintaining sufficient lifetime for polishing pads and also for maintaining adequate removal rates and selectivity during the lifetime of the pad.

This and other objects of the invention are achieved by providing a CMP composition which comprises:
(a) a colloidal silica;
(b) an amino acid;
(c) an acidic compound;
(d) an aqueous carrier; and
(e) optionally, one or more additives.

For the purposes of this invention, the composition can be in solution or slurry form.

Another object of the invention is polish a surface and extend the life of a polishing pad and/or maintain the selectivity of the polishing pad used in the polishing process which comprises of polishing the surface with the CMP composition of the invention.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

All "% by weight" is based on the total weight of the composition, solution or slurry except where otherwise indicated.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

The various embodiments and examples of the present invention as presented herein are understood to be illustrative of the present invention and not restrictive thereof and are non-limiting with respect to the scope of the invention. These and other embodiments are disclosed or are apparent from and encompassed by, the following Detailed Description of the Invention.

DETAILED DESCRIPTION OF THE INVENTION

The present invention provides a CMP solution for chemical mechanical polishing which comprises:
(a) a colloidal silica;
(b) an amino acid;
(c) an acidic compound;
(d) an aqueous carrier; and
(e) optionally, one or more additives.

In another embodiment of the invention, the CMP solution for chemical mechanical polishing consists of:
(a) a colloidal silica;
(b) an amino acid;
(c) an acidic compound; and
(d) an aqueous carrier.

In one embodiment of the invention, the composition is for polishing a silicon nitride containing surface with oxide and/or polysilicon as adjacent layers. In another embodiment of the invention, the CMP solution composition for abrading silicon nitride materials with varying pH from 1 to 4 consists of colloidal silica, an amino acid, at least one acidic component, and an aqueous carrier.

The colloidal silica present in the CMP composition in an amount in the range of about 0.01 to about 15 percent by weight. In another embodiment of the invention, the colloidal silica is present in the CMP composition in an amount in the range of about 0.05 to about 5 percent by weight. In yet another embodiment of the invention, the amount of colloidal silica is present in an amount from about 2% to about 4% by weight. In still another embodiment of the invention, the amount of colloidal silica is present in an amount from about 0.1% to about 0.5% by weight, based on the weight of the CMP composition.

The size of the colloidal silica particles have a mean particle size in the range selected from the group consisting of about 1 nm to about 500 nm, about 5 nm to about 130 nm and about 10 nm to about 40 nm.

Organic compounds that have an amino group and an acid group are referred to as amino acids. For the purposes of this invention, all individual stereoisomers and racemic mixtures thereof are also contemplated for the amino acids. In one embodiment of the invention, both the amino and the acid groups are attached to one carbon (termed as alpha-amino carboxylic acids) are used as the chemical additive in the CMP slurry. Many alpha-amino carboxylic acids are known and there are twenty "natural" amino acids which are used as basic components of proteins in living organisms. The amino acids can be hydrophilic, neutral or hydrophobic depending on their side chains in presence of an aqueous carrier.

In another embodiment of the invention, the amino acids having neutral and hydrophobic side chains are used in the CMP composition. Examples include but are not limited to glutamate, aspartate, glutamine, tyrosine, tryptophan, serine, threonine, glycine, alanine, methionine, cysteine, phenylalanine, leucine, valine, isoleucine and mixtures thereof. In still another embodiment of the invention, the hydrophobic amino acid is a compound of formula (I):

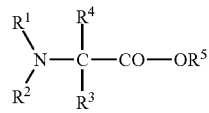

wherein:
R$^1$ and R$^2$ are independently hydrogen, C$_1$-C$_4$ alkyl;
or R$^1$ and R$^2$ together with the nitrogen form a 3-8 membered ring;
R$^3$ and R$^4$ are independently hydrogen; C$_1$-C$_{24}$ alkyl optionally substituted with a heterocyclic ring or a heterocyclic ring fused with a phenyl ring; C$_1$-C$_{24}$ phenylalkyl optionally substituted with —OH; C$_1$-C$_{24}$ thioalkyl or C$_1$-C$_{24}$ alkylthioalkyl; and
R$^5$ is a hydrogen or a C$_1$-C$_{24}$ alkyl.

Another embodiment of the hydrophobic amino acids, at least one of R$^3$ or R$^4$ is not hydrogen. The hydrophobic amino acids may also include, but are not limited to alanine, cysteine, tyrosine, phenylalanine, tryptophan, methionine, lecuine, valine, isoleucine and mixtures thereof.

In another embodiment of the hydrophobic amino acids are compounds of formula (I) wherein:
R$^1$ and R$^2$ are independently hydrogen, C$_1$-C$_4$ alkyl;
or R$^1$ and R$^2$ together with the nitrogen form a 5-6 membered ring;
R$^3$ and R$^4$ are independently hydrogen; C$_1$-C$_4$ alkyl optionally substituted with a nitrogen containing 5-6 membered heterocyclic ring fused with a phenyl ring; C$_1$-C$_4$ phenylalkyl optionally substituted with —OH; C$_1$-C$_4$ thioalkyl or C$_1$-C$_4$ alkylthioalkyl; and at least one of
R$^3$ or R$^4$ is not hydrogen; and
R$^5$ is a hydrogen or a C$_8$-C$_{24}$ alkyl.

In another embodiment of the hydrophobic amino acids are compounds of formula (I) wherein:
R$^1$ and R$^2$ are independently hydrogen or methyl;
or R$^1$ and R$^2$ together with the nitrogen form a 5-6 membered ring;
R$^3$ and R$^4$ are independently hydrogen; C$_1$-C$_4$ alkyl; C$_1$-C$_4$ thioalkyl or C$_1$-C$_4$ alkylthioalkyl;
and at least one of R$^3$ or R$^4$ is not hydrogen; and
R$^5$ is a hydrogen or a C$_{12}$-C$_{18}$ alkyl.

In still another embodiment of the hydrophobic amino acid, the amino acid is cysteine.

The amount of amino acid present in the CMP composition can be selected from a range consisting of about 0.005 to about 5% by weight, about 0.01 to about 1% by weight, and about 0.05% to about 0.5% by weight, based on the total weight of the CMP composition.

The acidic compound includes, but is not limited to, inorganic, carboxylic, organic, organophosphonic acids, an acidic heterocyclic compounds, a salt thereof or a mixture of two or more of the foregoing.

Aqueous carrier includes, but is not limited to, any aqueous solvent like water, aqueous alcohols, and mixtures thereof and the like. In one embodiment of the invention, the aqueous carrier is deionized water.

Optionally, the CMP composition may include additives such as oxidizing agents suitable for use in the CMP composition which includes, but is not limited to hydrogen peroxide, persulfate salts, (e.g., ammonium or potassium mono and di persulfates), periodate and iodate salts, periodic acids and mixtures thereof. Other additives such as complexing agents, corrosion inhibitors, viscosity modifying agents, and biocides can also be optionally included in the polishing composition of the invention. In one embodiment of the invention, one or more of these optional additives can be specifically excluded from the CMP composition of the invention.

The CMP compositions of the present invention are suited for use in combination with chemical mechanical polishing machine wherein a polishing pad is used to planarize the surface of a substrate.

In one embodiment of the invention includes use of the CMP slurry which comprises a mixture of colloidal silica abrasive, with and without a hydrophobic amino acid, one acidic component, and an aqueous carrier; with a polishing pad of varying pad life to polish a substrate surface with adjacent layers which are different than the substrate surface. In another embodiment of the invention, the substrate is a silicon nitride substrate and the adjacent layers is an oxide and/or polysilicon layers. The lifetime of the polishing pad is defined as the number of substrates polished when there is a detrimental decrease in removal rate selectivity of nitride over oxide and/or polysilicon materials.

In one embodiment of the invention, the lifetime of the pad was determined by comparing the selectivity of a silicon nitride surface over oxide and/or polysilicon by polishing with both control composition (without an amino acid) and CMP composition of the invention (with a hydrophobic amino acid).

Suitable polishing pads made of polymers which include, but not limited to polyvinyl chloride, polyvinyl fluoride, nylon, fluorocarbon, polycarbonate, polyester, polyacrylate, polyether, polyethylene, polyamide, polyurethane, polystyrene, polypropylene, conformed products thereof, and mixtures thereof. In one embodiment of the invention the polishing pad comprises of polyurethane material or derivatives thereof.

In another embodiment of the invention, the normalized pad life is increased by a factor selected from the group consisting of about 2 to about 20 times the normal lifetime, about 4 to about 15 times the normal lifetime and about 6 to about 12 times the normal lifetime and the selectivity at the end of the pad life relative to a single lifetime for the adjacent layer is in a range selected from the group consisting of about 60% to about 150%, about 75% to about 135% and about 85% to about 125%.

In another embodiment of the invention, when the amount of colloidal silica is present in an amount between about 2% to about 4%, the normalized pad life is increased by a factor of about 4 to about 6 times the normal lifetime and the selectivity at the end of the pad life relative to a single lifetime for an oxide layer is in a range selected from the group consisting of about 80% to about 120%, about 90% to about 110% and about 95% to about 105% and the selectivity at the end of the pad life relative to a single lifetime for a polysilicon layer is in a range selected from the group consisting of about 85% to about 150%, about 100% to about 135% and about 110% to about 125%.

In another embodiment of the invention, when the amount of colloidal silica is present in an amount between about 0.1% to about 0.5%, the normalized pad life is increased by a factor of about 10 to about 15 times the normal lifetime and the selectivity at the end of the pad life relative to a single lifetime for an oxide layer is in a range selected from the group consisting of about 85% to about 135%, about 95% to about 125% and about 105% to about 115% and the selectivity at the end of the pad life relative to a single lifetime for a polysilicon layer is in a range selected from the group consisting of about 60% to about 110%, about 70% to about 100% and about 80% to about 90%.

Various combinations of the above embodiments are also within the scope of this invention. The invention will now be further described by way of the following non-limiting examples.

EXAMPLES

General

Silicon nitride, oxide and polysilicon wafers in Examples 1 and 2 were polished with a series of polishing compositions as described below on a Strasbaugh 6EG nHance polisher at a down force of 2.7 psi, a platen speed of 93 rpm, carrier speed of 87 rpm and polishing slurry flow rate of about 200 ml/min.

Example 1

Polishing of Silicon Nitride Substrates with CMP Slurry Composition with High Abrasive Concentration This example illustrates the effectiveness of the compositions of the present invention for polishing silicon nitride substrates while maintaining high selectivity over oxide and/or polysilicon substrates through the lifetime of the polishing pad.

Both control and inventive CMP slurry compositions were prepared in deionized water (aqueous carrier) including 3 percent by weight of colloidal silica (having a mean particle size of about 20 nm) with about 0.2 percent by weight of hydroethylidene-1,1-diphosphonic acid as the acid component.

The inventive CMP slurry composition (Composition 1) has an additional additive of 0.1 percent by weight of hydrophobic amino acid which the control does not contain (Control 1). In this embodiment, the hydrophobic amino acid used was cysteine.

| CMP slurry components of the invention | % by weight |
|---|---|
| Colloidal silica (with mean particle size of about 20 nm) | 3.0 |
| Hydroethylidene-1,1-diphosphonic acid | 0.2 |
| Cysteine | 0.1 |
| Deionized water | q.s. |

The results for these tests are shown in Table 1 below with normalized life time of the polishing pad.

TABLE 1

| | Effect of Pad Life on Selectivity at High Abrasive Concentration | | | | | |
|---|---|---|---|---|---|---|
| Polishing Composition | Normalized polishing pad life | Silicon nitride removal rate (Å/min) | Silicon oxide removal rate (Å/min) | Poly silicon removal rate (Å/min) | Silicon nitride:Silicon oxide selectivity | Silicon nitride:Poly-silicon selectivity |
| Control 1 | 1X | 522 | 239 | 84 | 2.18 | 6.21 |
| Control 1 | 5X | 349 | 293 | 255 | 1.19 | 1.37 |
| Composition 1 | 1X | 518 | 264 | 98 | 1.96 | 5.29 |
| Composition 1 | 6X | 403 | 202 | 62 | 1.99 | 6.5 |

Table 1 shows that the addition of cysteine maintains the selectivity of silicon nitride over silicon oxide and/or polysilicon materials while extending the life of the polishing pad.

Example 2

Polishing of Silicon Nitride Substrates with CMP Slurry Composition with Low Abrasive Concentration This example illustrates the effectiveness of the compositions of the present invention for polishing silicon nitride substrates while maintaining very high selectivity over oxide and/or polysilicon substrates through the lifetime of the polishing pad.

Both control and inventive CMP slurry compositions were prepared in deionized water (aqueous carrier) including 0.2 percent by weight of colloidal silica (having a mean particle size of about 20 nm) with about 0.2 percent by weight of hydroethylidene-1,1-diphosphonic acid as the acid component. The inventive CMP slurry composition has an additional additive of 0.1 percent by weight of hydrophobic amino acid which the control does not contain. In this embodiment, hydrophobic amino acid used was cysteine.

| CMP slurry components | % by weight |
|---|---|
| Colloidal silica (with mean particle size of about 20 nm) | 0.2 |
| Hydroethylidene-1,1-diphosphonic acid | 0.2 |
| Cysteine | 0.1 |
| Deionized water | q.s. |

The results for these tests are shown in Table 2 with normalized life time of the polishing pad.

TABLE 2

Effect of Pad Life on Selectivity at Low Abrasive Concentration

| Polishing Composition | Normalized polishing pad life | Silicon nitride removal rate (Å/min) | Silicon oxide removal rate (Å/min) | Poly silicon removal rate (Å/min) | Silicon nitride:Silicon oxide selectivity | Silicon nitride:Poly-silicon selectivity |
|---|---|---|---|---|---|---|
| Control 2 | 1X | 475 | 33 | 57 | 14.39 | 8.33 |
| Control 2 | 6X | 303 | 46 | 114 | 6.59 | 2.66 |
| Composition 2 | 1X | 496 | 38 | 62 | 13.05 | 8.00 |
| Composition 2 | 12X | 299 | 21 | 44 | 14.24 | 6.80 |

Table 2 shows that addition of cysteine maintains the selectivity of silicon nitride over silicon oxide and/or polysilicon materials while extending the life of the polishing pad.

Whereas particular embodiments of this invention have been described above for purposes of illustration, it will be evident to those skilled in the art that numerous variations of the details of the present invention may be made without departing from the invention as defined in the appended claims. The scope of the present invention is intended to be defined by the appended claims and equivalents thereto.

What is claimed is:

1. A chemical mechanical polishing (CMP) composition, consisting of:
   (a) colloidal silica;
   (b) cysteine;
   (c) an organophosphonic acid or a salt thereof;
   (d) an aqueous carrier selected from the group consisting of water and an aqueous alcohol, and optionally
   (e) one or more additives selected from the group consisting of oxidizing agents complexing agents, viscosity modifying agents, and biocides.

2. The CMP composition of claim 1, wherein an amount of the colloidal silica present in the CMP composition is within a range selected from the group consisting of
   0.01 to 15 percent by weight,
   0.05 to 5 percent by weight,
   2% to 4% by weight and
   0.1% to 0.5% by weight,
based on a total weight of the CMP composition.

3. The CMP composition of claim 1, wherein a mean particle size of the colloidal silica is in a range selected from the group consisting of
   1 nm to 500 nm,
   5 nm, to 130 nm, and
   10 nm to 40 nm.

4. The CMP composition of claim 1, wherein an amount of the cysteine present in the CMP composition is selected from the group consisting of
   0.005 to 5% by weight,
   0.01 to 1% by weight, and
   0.05% to 0.5% by weight,
based on a total weight of the CMP composition.

5. The CMP composition of claim 1, wherein said organophosphonic acid or a salt thereof is hydroethylidene-1,1-diphosphonic acid.

6. The CMP composition of claim 1, wherein the aqueous carrier is water.

7. A method of polishing a substrate with at least one adjacent layer, comprising:
   applying the CMP composition of claim 1 to a polishing pad or a surface of the polishing pad during chemical mechanical polishing.

8. The method of claim 7, wherein the substrate is a silicon nitride substrate and the at least one adjacent layer comprises at least one of an oxide and a polysilicon layer.

9. A method of extending the life of a polishing pad and/or maintaining the selectivity of a polishing pad in chemical mechanical polishing, comprising: applying the CMP composition of claim 1 to a polishing pad or a surface of the polishing pad during chemical mechanical polishing.

10. The CMP composition of claim 1, consisting of:
    (a) colloidal silica;
    (b) cysteine;
    (c) an organophosphonic acid or a salt thereof; and
    (d) an aqueous carrier selected from the group consisting of water and an aqueous alcohol.

11. The CMP composition of claim 10, wherein an amount of the colloidal silica present in the CMP composition is within a range selected from the group consisting of
    0.01 to 15 percent by weight,
    0.05 to 5 percent by weight,
    2% to 4% by weight and
    0.1% to 0.5% by weight,
based on a total weight of the CMP composition.

12. The CMP composition of claim 10, wherein a mean particle size of the colloidal silica is in a range selected from the group consisting of
    1 nm to 500 nm,
    5 nm, to 130 nm, and
    10 nm to 40 nm.

13. The CMP composition of claim 10, wherein an amount of the cysteine present in the CMP composition is selected from the group consisting of
    0.005 to 5% by weight,
    0.01 to 1% by weight, and
    0.05% to 0.5% by weight,
based on a total weight of the CMP composition.

14. The CMP composition of claim 10, wherein said organophosphonic acid or a salt thereof is hydroethylidene-1,1-diphosphonic acid.

15. The CMP composition of claim 10, wherein the aqueous carrier is water.

16. A method of polishing a substrate with at least one adjacent layer, comprising:
    applying the CMP composition of claim 10 to a polishing pad or a surface of the polishing pad during chemical mechanical polishing.

17. The method of claim 16, wherein the substrate is a silicon nitride substrate and the at least one adjacent layer comprises at least one of an oxide and a polysilicon layer.

18. A method of extending the life of a polishing pad and/or maintaining the selectivity of a polishing pad in chemical mechanical polishing, comprising:
    applying the CMP composition of claim 10 to a polishing pad or a surface of the polishing pad during chemical mechanical polishing.

19. The CMP composition of claim 1, wherein the aqueous carrier is an aqueous alcohol.

20. The CMP composition of claim 10, wherein the aqueous carrier is an aqueous alcohol.

* * * * *